US009163806B1

(12) United States Patent
Shimoda (10) Patent No.: US 9,163,806 B1
(45) Date of Patent: Oct. 20, 2015

(54) WIDE ANGLE OPTICAL SYSTEM FOR LED ARRAY

(71) Applicant: Whelen Engineering Company, Inc., Chester, CT (US)

(72) Inventor: Kyle Shimoda, Middletown, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 14/243,931

(22) Filed: Apr. 3, 2014

(51) Int. Cl.
*F21V 5/04* (2006.01)
*F21V 13/04* (2006.01)
*F21S 4/00* (2006.01)
*F21V 7/00* (2006.01)
*F21Y 103/00* (2006.01)

(52) U.S. Cl.
CPC .............. *F21V 13/04* (2013.01); *F21S 4/008* (2013.01); *F21V 5/048* (2013.01); *F21V 7/005* (2013.01); *F21Y 2103/003* (2013.01)

(58) Field of Classification Search
CPC ......... F21V 5/008; F21V 5/007; F21V 5/048; F21V 5/046; F21V 5/045; F21V 7/07; F21V 13/04; F21V 7/005; F21Y 2103/003; F21S 4/008
USPC ........ 362/545, 249.02, 311.02, 311.06, 311.1
See application file for complete search history.

(56) References Cited

U.S. PATENT DOCUMENTS

| | | | |
|---|---|---|---|
| 6,641,284 B2 | 11/2003 | Stopa et al. | |
| 6,739,738 B1 | 5/2004 | Smith | |
| 6,851,835 B2 | 2/2005 | Smith et al. | |
| 7,008,079 B2 | 3/2006 | Smith | |
| 7,079,041 B2 | 7/2006 | Fredericks et al. | |
| 7,083,313 B2 | 8/2006 | Smith | |
| 7,118,261 B2 | 10/2006 | Fredericks et al. | |
| 7,158,019 B2 | 1/2007 | Smith | |
| 7,520,650 B2 | 4/2009 | Smith | |
| 2010/0271818 A1 * | 10/2010 | Smith | 362/235 |

* cited by examiner

*Primary Examiner* — Sharon Payne
(74) *Attorney, Agent, or Firm* — Alix, Yale & Ristas, LLP (57) ABSTRACT

An optical system includes a lens and reflector configured to form a wide angle beam from light emitted from an array of LEDs by modifying only the component of emitted light that diverges from a reference plane. A central portion of the lens collimates emitted LED light relative to the reference plane containing the optical axes of the LEDs. A peripheral portion of the lens re-directs emitted LED light into an orientation perpendicular to the reference plane. The reflector surrounds the periphery of the lens and re-directs light from the peripheral portion of the lens into a direction parallel with the reference plane. The linear array of LEDs may include sub arrays projecting away from a support plane to enhance visibility of a resulting light signal from vantage points close to or aligned with the support plane.

8 Claims, 9 Drawing Sheets

WIDE ANGLE OPTICAL SYSTEM FOR LED ARRAY

BACKGROUND

The present invention relates generally to optical systems for distributing light from a light source and more particularly to an optical system for combining the light output of a plurality of LEDs into a wide angle beam.

Commercially available LED's have characteristic spatial radiation patterns with respect to an optical axis which passes through the light emitting die. A common characteristic of all of LED radiation patterns is that light is emitted from one side of a plane containing the light emitting die in a pattern surrounding the LED optical axis, which is perpendicular to the plane. Light generated by an LED is radiated within a hemisphere centered on the optical axis. The distribution of light radiation within this hemisphere is determined by the shape and optical properties of the lens (if any) covering the light emitting die of the LED. Thus, LED's can be described as "directional" light sources, since all of the light they generate is emitted from one side of the device.

When designing light sources for a particular purpose, it is important to maximize efficiency by ensuring that substantially all of the generated light is arranged in a pattern or field of illumination dictated by the end use of the device into which the light source is incorporated. The somewhat limited overall light output of individual LEDs frequently necessitates that several discrete devices be cooperatively employed to meet a particular photometric requirement. Employing LEDs in compact arrays additionally imposes cooling, i.e., "heat sinking", requirements to prevent heat from accumulating and damaging the LEDs.

The use of LED's in warning and signaling lights is well known. Older models of LED's produced limited quantities of light over a relatively narrow viewing angle centered on an optical axis of the LED. These LED's were typically massed in compact arrays to fill the given illuminated area and provide the necessary light output. More recently developed, high output LED's produce significantly greater luminous flux per component, permitting fewer LED's to produce the luminous flux required for many warning and signaling applications. It is known to arrange a small number of high-output LED's in a light fixture and provide each high-output LED with an internally reflecting collimating lens such as that shown in FIG. 2. The collimating lens organizes light from the LED into a collimated beam centered on the LED optical axis. Such an arrangement typically does not fill the light fixture, resulting in an undesirable appearance consisting of bright spots arranged against an unlit background. Light-spreading optical features on the outside lens/cover are sometimes employed to improve the appearance of the light fixture.

Figure 1:
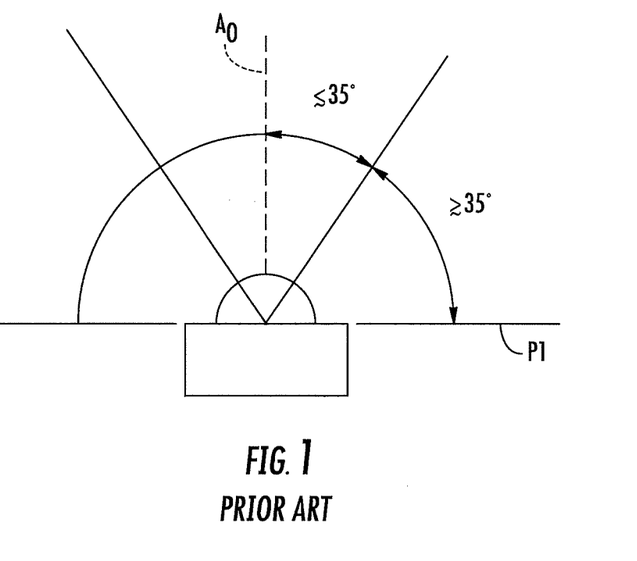
FIG. 1 is a representation of an LED showing a lambertian light emission pattern with respect to a reference plane P1.

For purposes of this application, light emitted from an LED can be described as "narrow angle" light emitted at an angle of less than about 35° from the optical axis and "wide angle" light emitted at an angle of more than about 35° from the optical axis as shown in FIG. 1. The initial "emitted" trajectory of wide angle and narrow angle light may necessitate manipulation by different portions of a reflector and/or optical element to provide the desired illumination pattern.

This application will discuss optical arrangements for modifying the emitted trajectory of light from an LED with respect to a reference line or plane. For purposes of this application, "collimated" means "re-directed into a trajectory substantially parallel with a reference line or plane." Substantially parallel refers to a trajectory within 5° of parallel with the reference line or plane. When discussing collimation of light with respect to a plane, it will be understood that the component of the emitted trajectory divergent from the reference plane is modified to bring the divergent component of the trajectory within 5° of parallel with the reference plane, while the component of emitted trajectory parallel with the reference plane is not modified. For LEDs mounted to a vertical surface, light is emitted in a hemispherical pattern centered on the optical axes of the LEDs, which are perpendicular to the vertical surface, i.e., the optical axis of each of the LEDs is horizontal. If the LEDs are mounted in a row, the optical axes are included in the same horizontal plane, which is typically the horizontal reference plane. In this situation, "vertically collimated" means that light which would diverge upwardly or downwardly from the horizontal reference plane (containing the LED optical axes) is re-directed into a direction substantially parallel to the horizontal plane. Assuming no other obstruction or change of direction, vertically collimated light from each LED will be dispersed across an arc of approximately 180° in a horizontal direction. The light of adjacent LEDs overlaps to create a horizontal beam having a peak intensity many times the peak intensity of any one of the LEDs.

Figure 2:
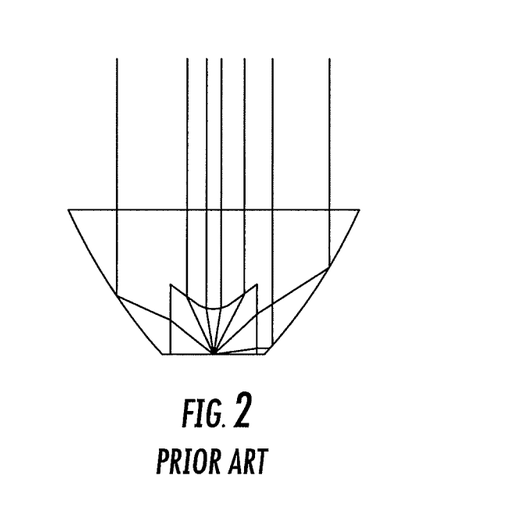
FIG. 2 is a sectional view through a prior art total internal reflecting (TIR) optic commonly used with LED light sources.

FIG. 2 illustrates a prior art collimator of a configuration frequently employed in conjunction with LED light sources. Light from an LED positioned in a cavity defined by the collimator is organized into a collimated beam aligned with the optical axis of the LED. The known internally reflecting collimator for an LED is a molded solid of light transmissive plastic such as acrylic or polycarbonate. The radial periphery of the collimator is defined by an aspheric internal reflecting surface flaring upwardly and outwardly to a substantially planar light emission surface. The bottom of the collimator includes a cavity centered over the LED optical axis. The cavity is defined by a substantially cylindrical side-wall and an aspheric upper surface. The aspheric upper surface is configured to refract light emitted at small angles relative to the LED optical axis to a direction parallel with the LED optical axis. The shape of the aspheric upper surface is calculated from the refractive properties of the air/solid interface, the position of the LED point of light emission relative to the surface, the configuration of the surface through which the light will be emitted, and the desired direction of light emission, e.g., parallel to the LED optical axis. The mathematical relationship between the angle of incidence of a light ray to a surface and the angle of the refracted ray to the surface is governed by Snell's Law: "The refracted ray lies in the plane of incidence, and the sine of the angle of refraction bears a constant ratio to the sine of the angle of incidence." (sin θ/sin θ'=constant, where θ is the angle of incidence and θ' is the angle of refraction)

For any particular point on the substantially cylindrical side-wall, the path of light refracted into the collimator can be calculated using Snell's law. The shape of the peripheral aspheric internal reflecting surface is calculated from the path of light refracted by the substantially cylindrical side-wall surface, the configuration of the surface through which light will be emitted, and the desired direction of light emission, e.g., parallel to the LED optical axis. The resulting aspheric internal reflecting surface redirects light incident upon it in a direction parallel to the optical axis of the LED.

The result is that substantially all of the light emitted from the LED is redirected parallel to the optical axis of the LED to form a collimated beam. This arrangement efficiently gathers light from the LED and redirects that light into a direction of intended light emission. Unless the light is somehow spread, the light from each LED appears to the viewer as a bright spot the size and shape of the collimator. It is typically less efficient to collimate light and then re-direct the collimated light into a desired pattern than it is to modify only those components of the emitted trajectory that do not contribute to the desired emission pattern, while leaving desirable components of the emitted trajectory undisturbed.

SUMMARY

An embodiment of a disclosed optical system employs an optical element in combination with a reflector to produce a wide angle beam having enhanced surface area from light emitted from a plurality of LEDs. This arrangement expands the illuminated portion of a light assembly incorporating the disclosed optical system. Although not limited to such a use, the disclosed optical system may be employed in a warning light fixed to a substantially vertical surface of an emergency vehicle. In such an orientation, the plurality of LEDs may be mounted to a support that extends outwardly from the vertical surface to enhance visibility from positions close to parallel with the surface to which the warning light is attached. For example, if the warning light is mounted to the side panel of the box of an ambulance, at least a portion of the LEDs may be mounted to a support that projects away from the side panel of the ambulance.

The illustrated embodiment of the disclosed optical system can be described with respect to a first plane parallel with the vehicle panel and a second plane containing the optical axes of a plurality of LEDs arranged along a line. Each of the LEDs has an optical axis perpendicular to a support surface to which the LED is mounted, so the optical axes of the LEDs in each array are contained in a second plane perpendicular to the first plane. A single row of LEDs arranged along a line may be referred to as a linear array. In the disclosed exemplary embodiment, the plane containing the optical axes of the LEDs is a horizontal plane. Those skilled in the art will understand that light generated from such an array of LEDs will have a range of emitted trajectories, each with a directional component parallel with the horizontal plane and a directional component divergent (up or down) from the horizontal plane. An illustrated embodiment of the disclosed optical system employs an optical element (lens) configured to re-direct specific portions of light from the linear array in a pre-determined way. A central portion of the optical element is configured to re-direct light with an emitted trajectory having a relatively small divergent directional component (light emitted at angles relatively close to the horizontal plane) into trajectories substantially parallel with the horizontal plane. This portion of the optical element is bisected by the horizontal plane containing the optical axes of the LEDs. The periphery of the optical element (surrounding the central portion) are configured to re-direct light with an emitted trajectory having a relatively large divergent directional component (light emitted at large angles relative to the horizontal plane) into trajectories substantially perpendicular to the horizontal plane.

The illustrated optical element is defined by light entry and light emission surfaces configured to cooperatively re-direct light emitted from the linear array of LEDs. The center of the optical element handles light with emitted trajectories with a divergent directional component below a pre-determined angle, while the periphery of the optical element handles light with emitted trajectories with a divergent directional component above the pre-determined angle. Together, the light entry surfaces define a pocket that fits over the linear array of LEDs. The light emission surfaces define the top and side surfaces of the optical element. The light entry and light emission surfaces are formed by projecting a sectional shape of the optical element along a linear focal axis extending between the area of light emission (die) of the LED at each end of the linear array. An end of the optical element may be a surface of rotation defined by rotating the sectional shape of the optical element about the optical axis of an LED at and end of the linear array.

The illustrated embodiment of the disclosed optical system employs a reflector configured to surround the periphery of the optical element and re-direct light emitted from the peripheral light emissions surfaces. Light is emitted from the peripheral light emission surfaces perpendicular to light emitted from the central portion of the optical element. The reflector includes reflecting surfaces arranged to re-direct light emitted from the peripheral surfaces of the optical element into a direction generally parallel with the second plane. The reflecting surfaces are spaced apart from the periphery of the optical element, giving added breadth and surface area to the light emission pattern from the disclosed optical system.

The disclosed optical system is described in the context of a particular warning light assembly intended for mounting to the vertical surface of an emergency vehicle. The illustrated warning light assembly includes LED arrays arranged to produce a warning light signal and another LED array configured to provide area illumination around the emergency vehicle. The LED arrays producing the warning light signal are configured to meet the requirements of SAE J845, J595, Class 1, California Title 13 or similar industry standards relevant to zonal optical warning devices. The illustrated warning light assembly employs the disclosed optical system to generate a warning light signal visible over an arc of approximately 180° in a horizontal plane. A support projects away from the base of the warning light assembly (and away from the side of the vehicle) to enhance visibility of the resulting warning light signal from vantage points close to parallel with the vehicle panel to which the illustrated warning light assembly is attached. One example of such a vantage point is a motorist or pedestrian in front or behind an emergency vehicle path of travel when the warning light assembly is mounted to one of the side panels of the vehicle.

DETAILED DESCRIPTION OF THE DISCLOSED EMBODIMENTS

Figure 3:
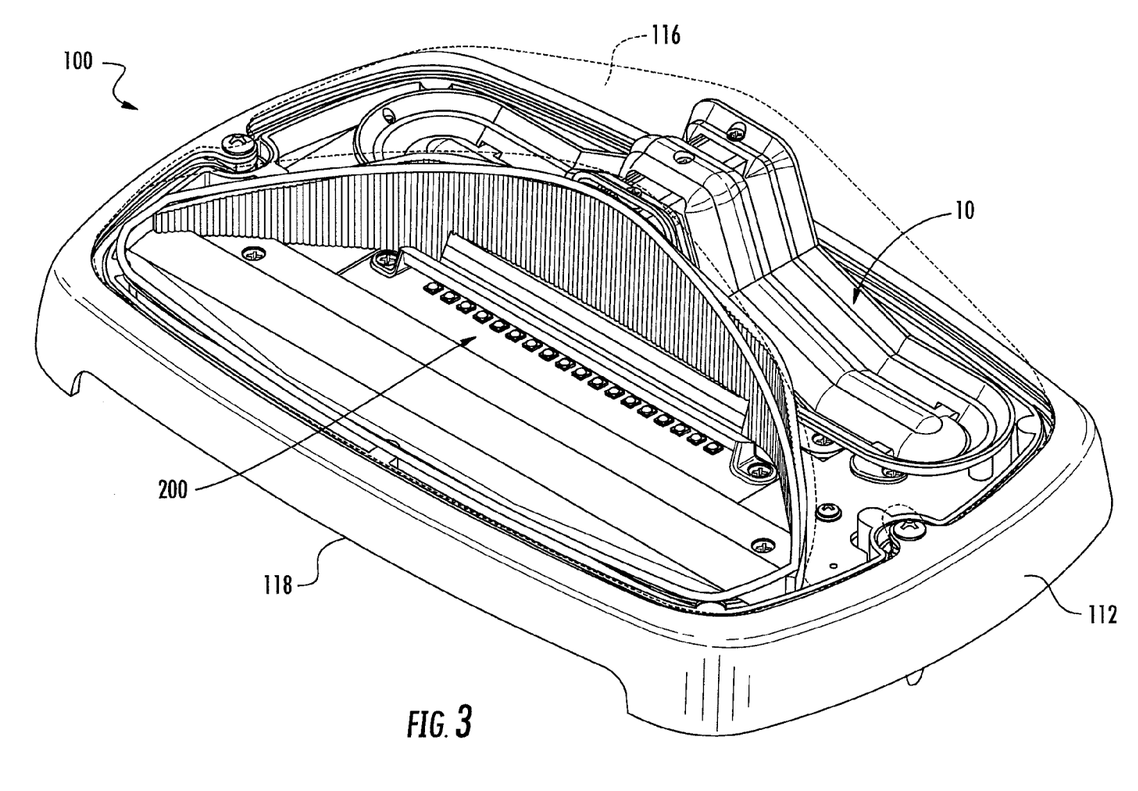
FIG. 3 is a perspective view (from below) of a warning light assembly incorporating an embodiment of the disclosed optical system.

An embodiment of the disclosed optical system will now be described with reference to FIGS. 3-10. FIG. 3 illustrates a warning light assembly 100 incorporating an embodiment of the disclosed optical system designated by reference number 10. The warning light assembly also incorporates a second LED array and optical system 200 configured to produce area and ground illumination adjacent an emergency vehicle to which the warning light assembly 100 is mounted. The warning light assembly 100 is configured to be mounted to a vertical body panel of an emergency vehicle (not shown) where the warning light assembly 10 generates a warning light signal while the second LED array and optical system 200 provide ground and area illumination. Each of these functions are required by state, federal, and industry standards applicable to emergency vehicles such as fire trucks and ambulances. In the past, warning and area illumination functions were provided by separate light assemblies mounted at various points on the vehicle body. Combining the warning and area illumination functions into a single warning light assembly should reduce the cost and complexity of installing such systems when constructing an emergency vehicle.

Figure 4:
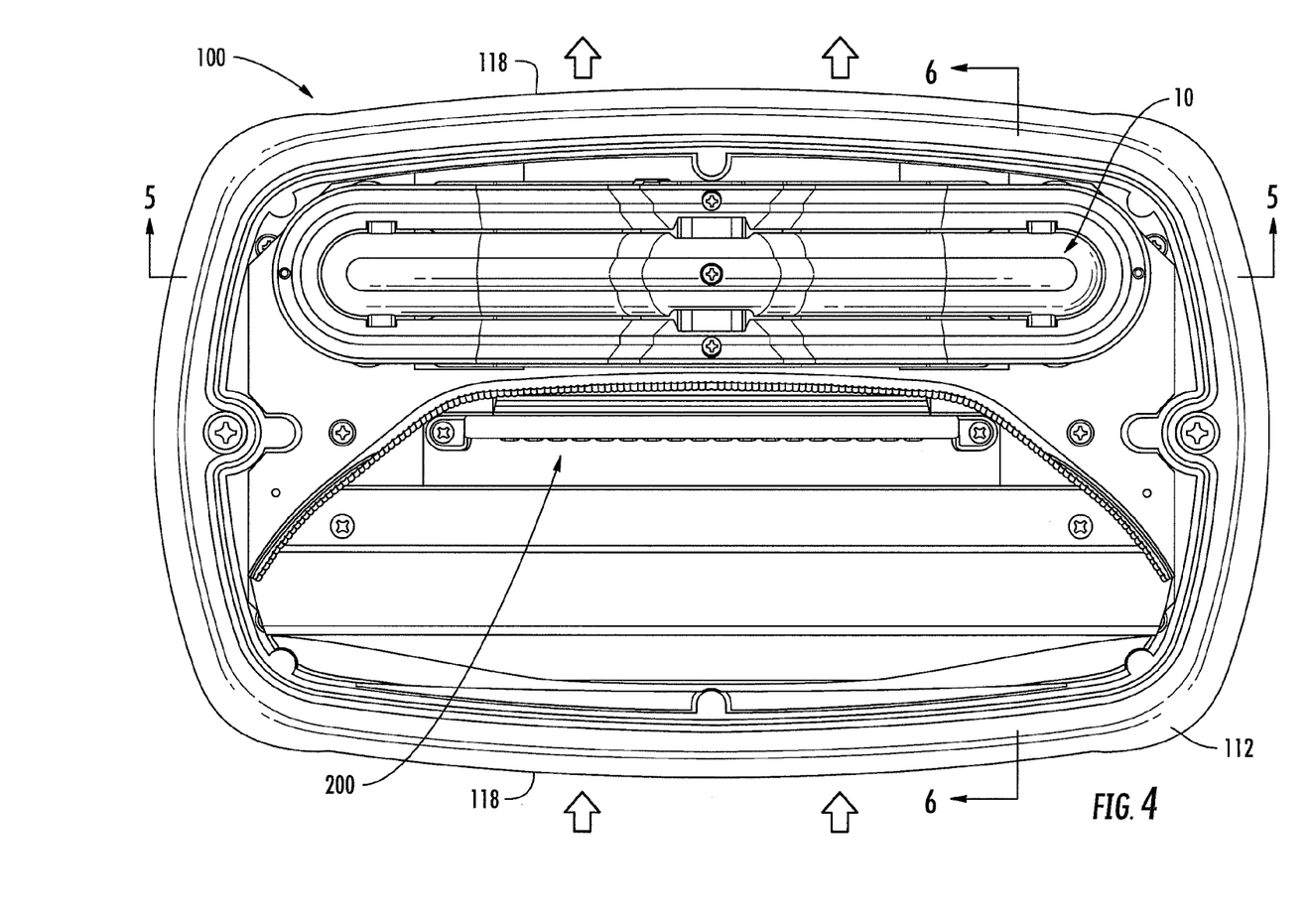
FIG. 4 is a front plan view of the warning light assembly of FIG. 3 with the outer lens removed to show the internal components.
Figure 5:
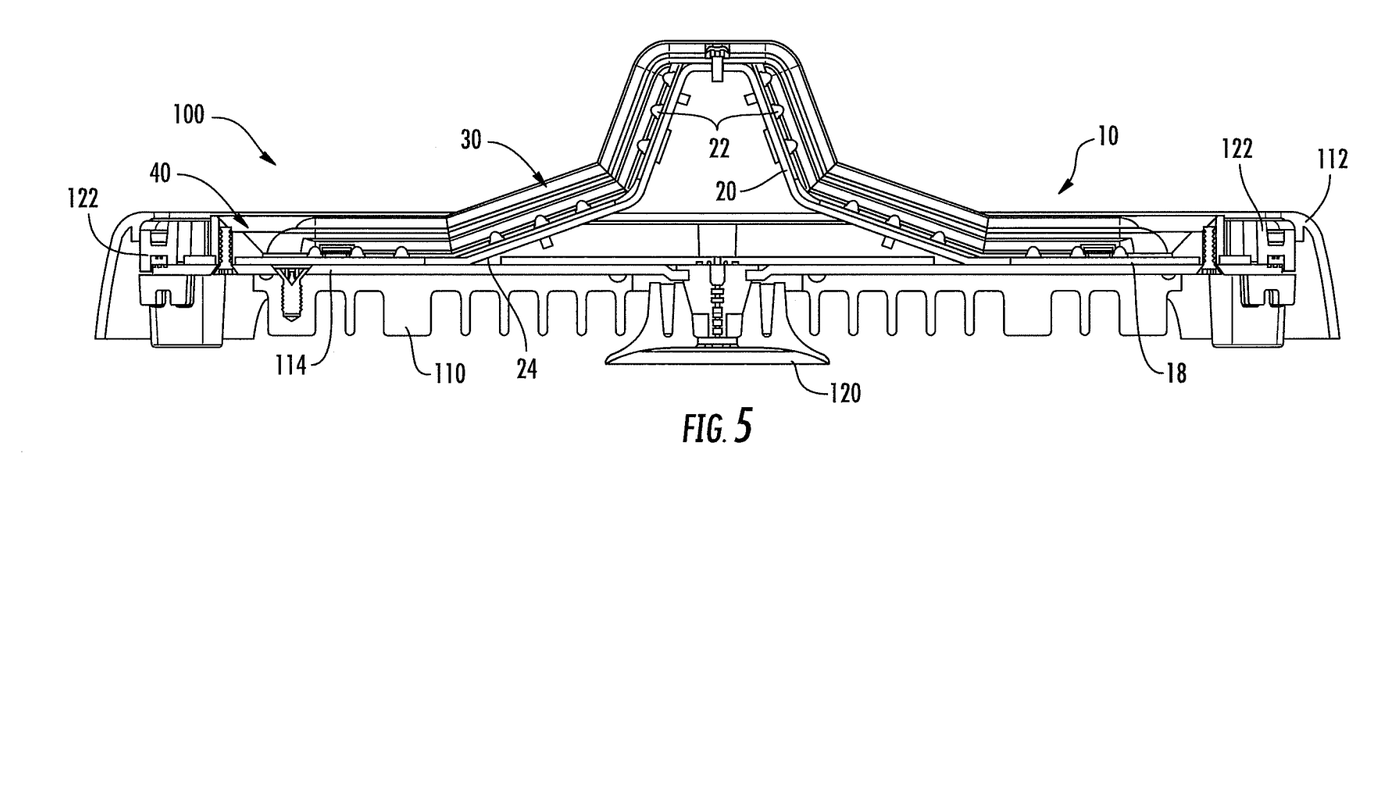
FIG. 5 is a longitudinal sectional view through the warning light assembly of FIG. 4, taken along line 5-5 thereof.

As shown in FIGS. 4 and 5, the warning light assembly 100 includes a heat sink 110, a bezel 112, and a sheet metal base 114, secured to the heat sink 110. A lens 116 (shown only in FIG. 3) mates with a frame 122 to form an enclosure surrounding the internal components of the warning light assembly 100. A rubber boot 120 extends from the rear of the warning light assembly 100 to seal against the body panel and prevent moisture from passing through any openings in the body panel used to deliver electrical wiring to the warning light assembly.

Figure 6:
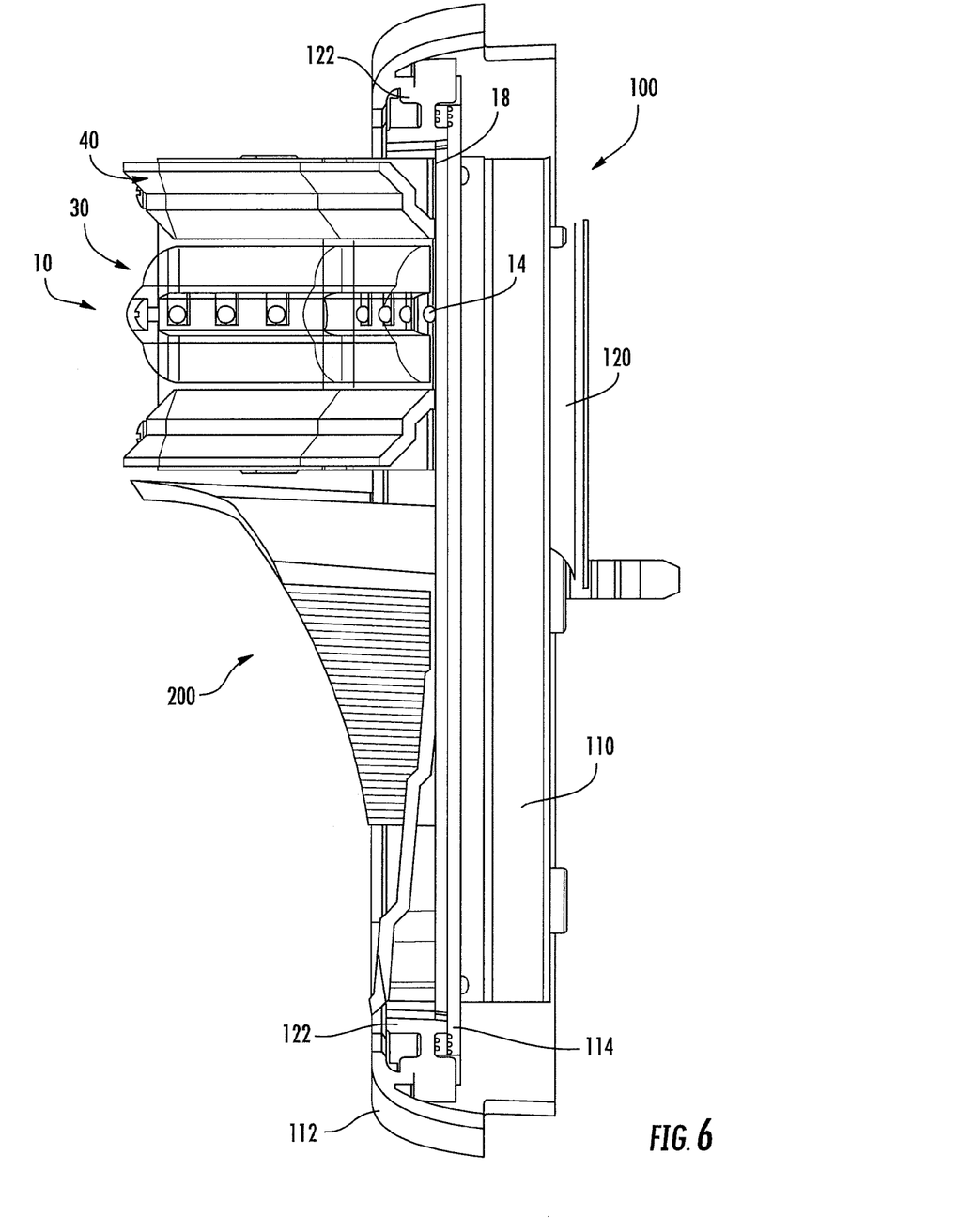
FIG. 6 is a vertical sectional view through the warning light assembly of FIG. 4, taken along line 6-6 thereof.
Figure 10:
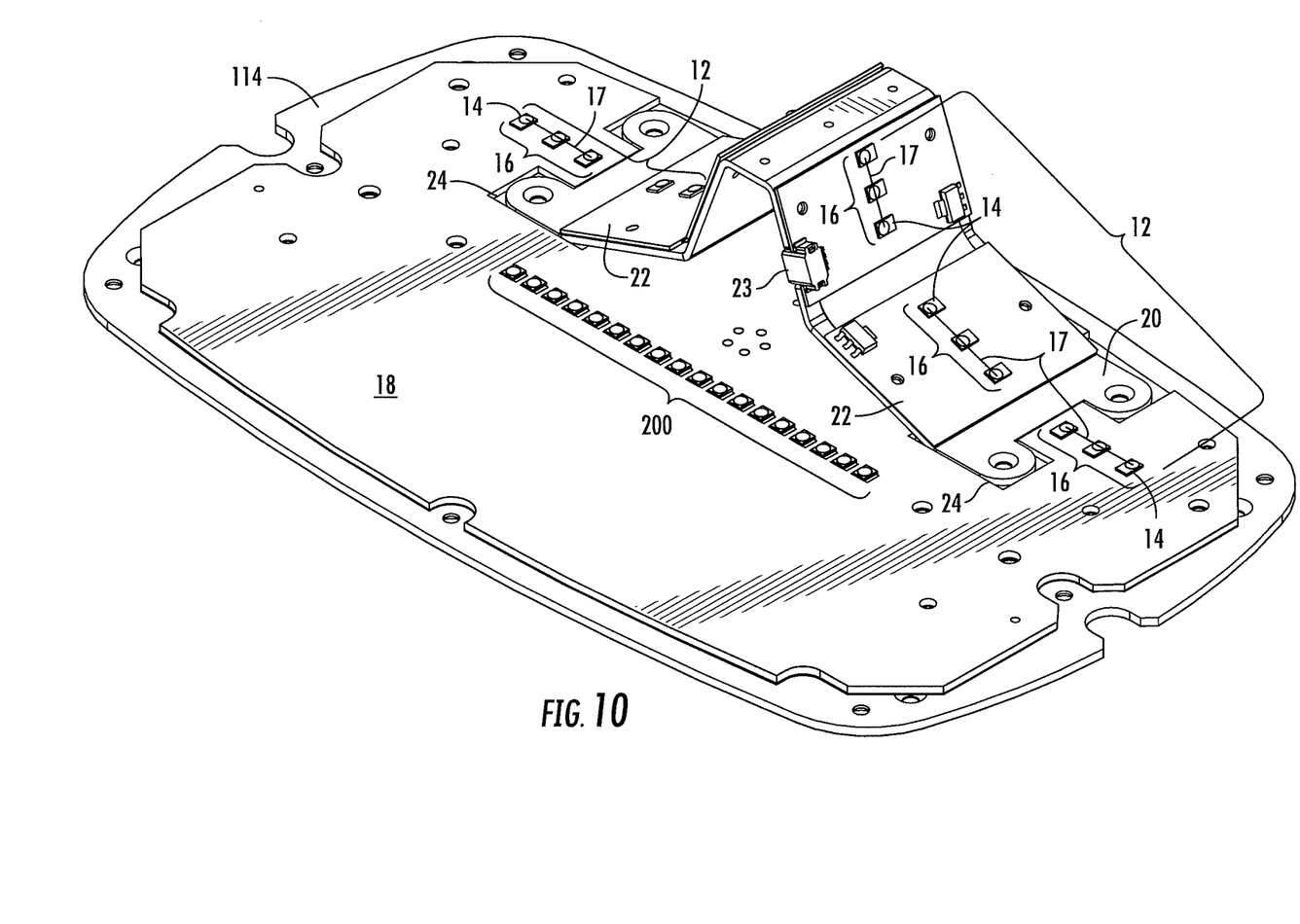
FIG. 10 illustrates the support base, main PC board, warning array bracket, and warning array PC boards of an illustrated embodiment of the warning light assembly for use in conjunction with the disclosed optical system.

The disclosed optical system 10 is used in conjunction with an array 12 of LEDs 14. As best shown in FIG. 10, the array 12 of LEDs 14 includes six sub-arrays 16 of LEDs 14. Some of the sub-arrays 16 are mounted to a main PC board 18, while some of the sub-arrays 16 are mounted to a sheet metal bracket 20 that projects away from the main PC board 18. The sub-arrays arranged on the bracket 20 are mounted to a PC board assembly 22 including two rigid boards connected by a flexible connector. Each PC board assembly 22 includes an electrical connector 23 to deliver electrical power to the sub-arrays 16. Each of the sub-arrays 16 may be energized independently of the other sub-arrays, but most commonly all the sub-arrays 16 will be energized at the same time to produce warning light signals. The main PC board 18 is secured in thermal contact with a sheet metal base 114. The main PC board 18 defines openings 24 that allow the bracket 20 to be secured in thermal contact with the sheet metal base 114. The sheet metal base 114 is mounted in thermal contact with the heat sink 110, as shown in FIGS. 5 and 6. Together, the PC boards 18, 22, sheet metal bracket 20, sheet metal base 110 and heat sink 114 provide a thermal pathway for heat generated by the LEDs 14. When mounted to a vertical body panel (not shown), the heat sink 114 fins are vertically oriented and aligned with openings 118 at the top and bottom of the bezel 112 to promote air flow to distribute heat from the warning light assembly 100 to the ambient environment.

Figure 8:
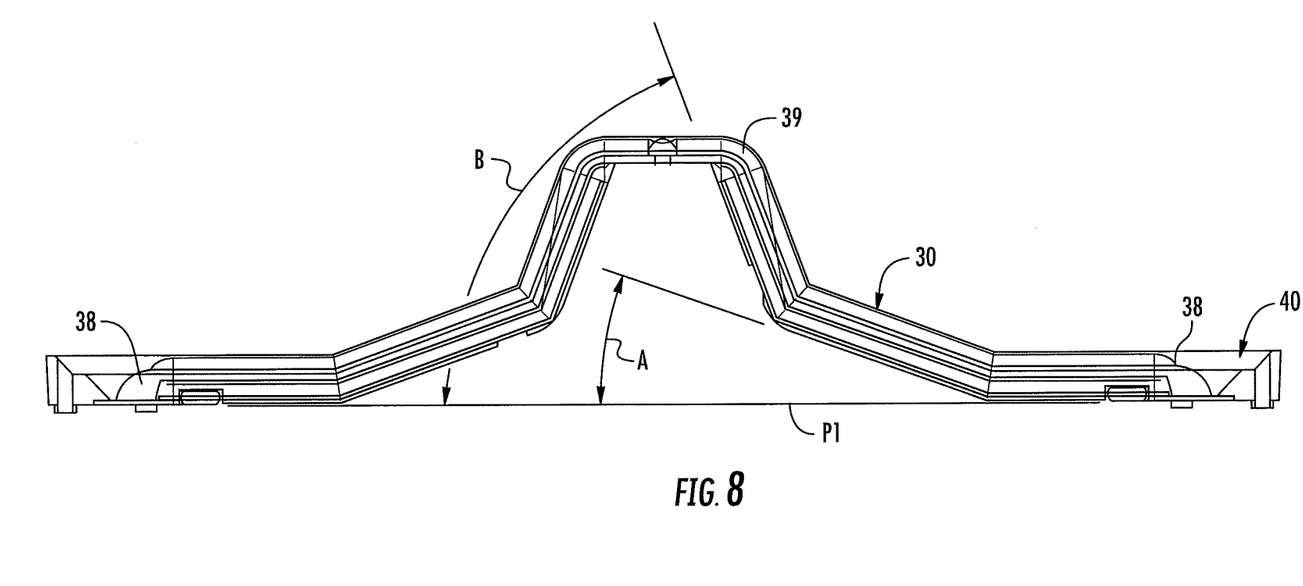
FIG. 8 is a longitudinal sectional view through the optical element and reflector of FIG. 7.

As best shown in FIG. 5, the illustrated embodiment of the disclosed optical system 10 includes an optical element (lens) 30 and a reflector 40 configured to fit over the LED array 12, supported by the bracket 20. Each of the optical element 30 and reflector 40 are segmented, with each segment corresponding to a sub-array 16 of LEDs 14. Generally, the relationship between each segment of the optical element 30 and the reflector 40 to each sub-array 16 is the same, so the relationship will only be described once. The bracket 20 supports four of the sub-arrays 16 in a position extending away from the base 114. As shown in FIG. 8, the disclosed bracket 20 supports sub-arrays 16 at angle A of 20° and angle B of 70° with respect to the base 116, which is parallel with a first plane P1. The bracket 20 extends the LED array 12 away from the base 114 and directs the light from each sub-array 16 to produce a highly conspicuous warning light signal extending over an arc of 180°. The extended position of the bracket 20, sub-arrays 16, optical element 30 and reflector 40 enhance visibility of the resulting light signal from vantage points close to or aligned with the plane of the vehicle panel to which the warning light assembly is attached.

Figure 9:
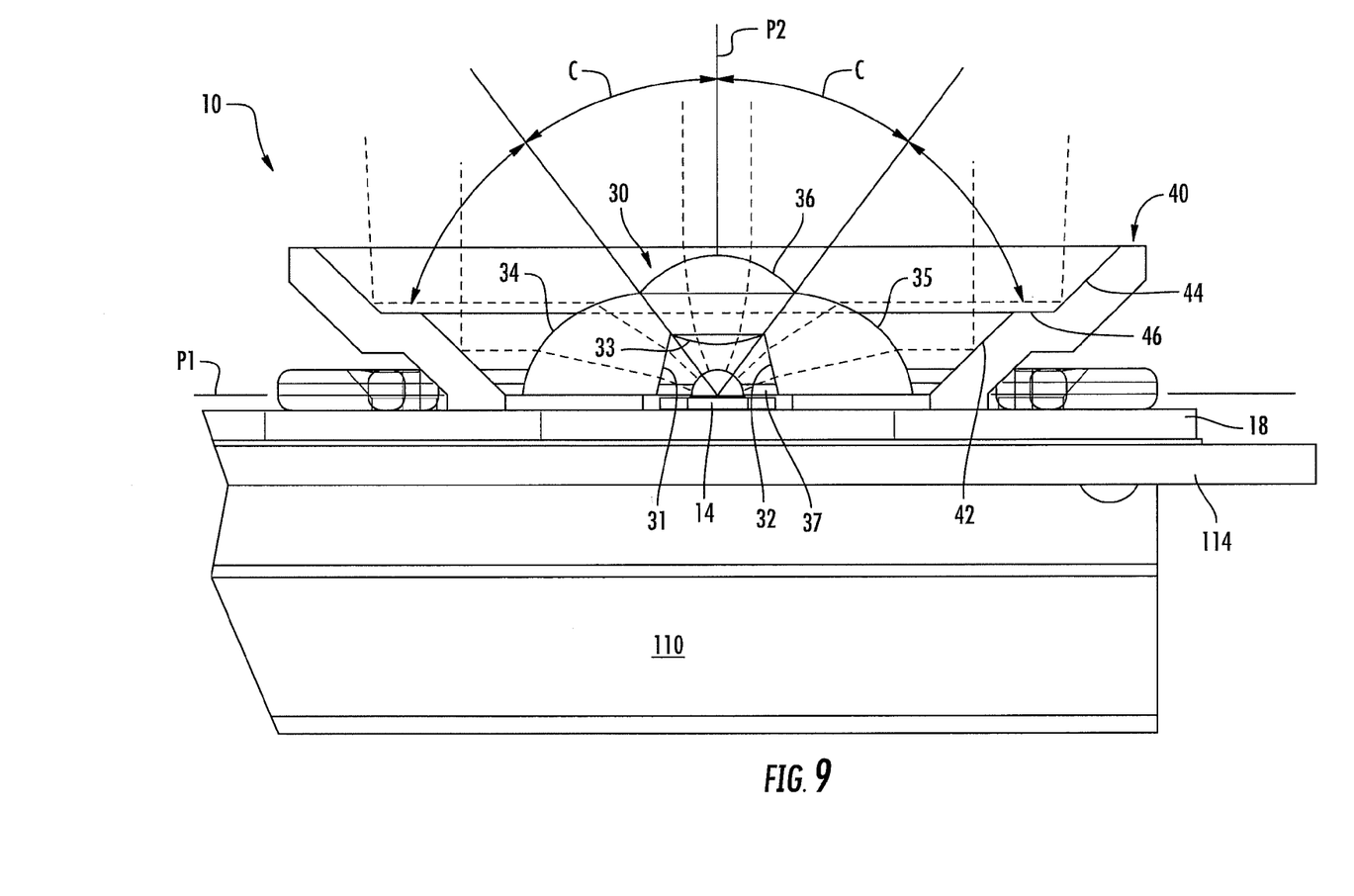
FIG. 9 is a partial vertical sectional view through an embodiment of the disclosed optical system in the context of the warning light assembly of FIG. 3, with extraneous components omitted for clarity.

FIG. 9 is an enlarged cross sectional view through a portion of the warning light assembly 100, showing the optical system 10 in functional relation to the main PC board 18, sheet metal base 114 and heat sink 110. This sectional view is taken at a position roughly corresponding to line 6-6 of FIG. 4. LED 14 is mounted to the main PC board 18 and the optical element 30 is aligned with plane P1 at this position. The optical element 30 is defined by light entry surfaces 31, 32, and 33 and light emission surfaces 34, 35, and 36. Light entry surfaces 31, 32, and 33 define a pocket 37 that receives the upper portion of the LED 14, situating the light emitting die of the LED 14 at a focus of the optical system 10. The surfaces defining each segment of the optical element 30 are defined by projecting the sectional shape of the optical element along the linear focal axis 17 of the LED sub-array 16. The linear focal axis 17 of each sub-array extends through the light emitting die at the center of each LED 14. The optical system 10 is configured to combine the light from the LED array 12 into a wide angle, vertically collimated beam. In FIG. 9, plane P1 generally corresponds to a vertical direction and plane P2 generally corresponds to a horizontal direction.

The light entry and light emission surfaces of the optical element 30 are configured to cooperate to re-direct light generated by the LED array 12 from an emitted trajectory to a pre-determined direction. In the illustrated embodiment, light entry surface 31 is configured to cooperate with light emission surface 34 to re-direct light emitted to one side of plane P2 at an angle greater than C, which in the illustrated embodiment is approximately 38°. The specific configuration of each surface is dependent upon the configuration of the paired surface and the desired direction of emission from the optical element. Any number of surface configuration combinations may be employed to achieve the desired re-direction. In the disclosed embodiment, light entry surface 31 is an aspheric surface, while light emission surface is an elliptical surface. Light entry surface 32 and light emission surface 35 have the same relationships and configurations as light entry surface 31 and light emission surface 34 and are mirror images thereof.

The center of the optical element 30 is defined by light entry surface 33 and light emission surface 36, which cooperate to re-direct light from an emitted trajectory into a direction generally parallel with plane P2, as shown in FIG. 9. Again, the surfaces are configured to achieve a pre-determined re-direction of light from the LED array 12, with any number of surface configurations being compatible with the disclosed optical element 30 and its function. In the disclosed embodiment, light entry surface 33 is an aspheric surface and light emission surface 36 is an elliptical surface. Surfaces 33 and 36 are projected along the linear focal axis 17 of the sub-array 16 until the surfaces meet the corresponding surfaces of the next segment of the optical element 30. In this manner, the relationship of the optical element 30 to each sub-array 16 is consistent along the length of the LED array 12 and the disclosed optical system.

Figure 7:
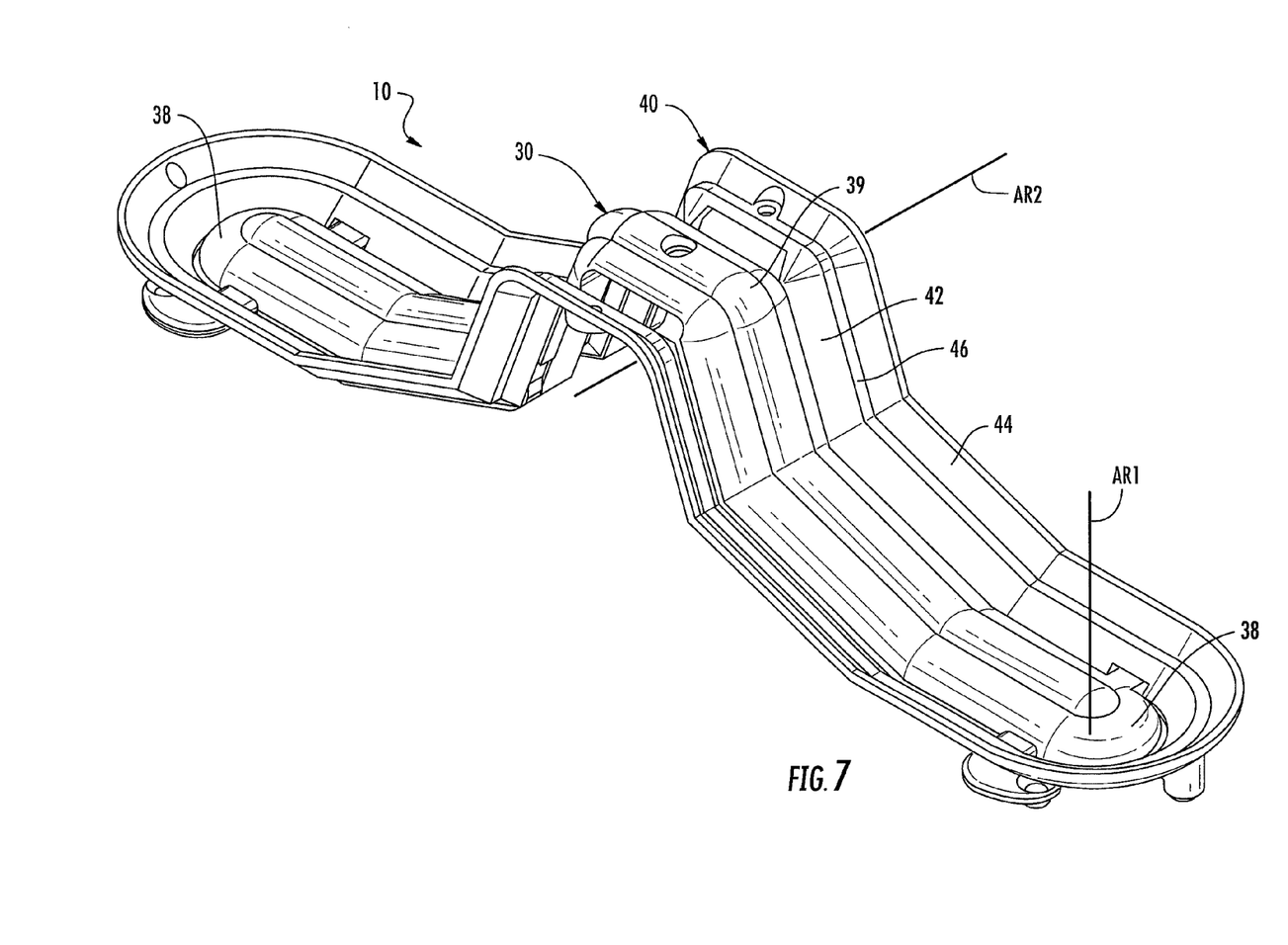
FIG. 7 is a perspective view of the optical element and reflector of an embodiment of the disclosed optical system.

The longitudinal ends 38 of the optical element 30 are defined by the sectional shape of the optical element 30 rotated about the optical axis AR1 of the LED 14 at each longitudinal end of the LED array 12. The reflector 40 is similarly rotated about the optical axis of these LEDs to form a shape complementary to the rotated shape of the ends 38 of the optical element 30. The optical element 30 and reflector 40 both take a 110° turn at the top of the optical system 10, as shown in FIGS. 7 and 8. The light entry and light emission surfaces defining the sectional shape of the optical element 30 are rotated about an axis AR2, which forms the curved portion 39 of the optical element 30. The curved portion 39 blends light from one side of the LED array 12 with light from the other side to form the desired wide angle beam. Blending light from both sides of the LED array 12 also aids in avoiding an undesirable dark spot in the middle of the wide angle beam. Axes AR1 and AR2 are substantially perpendicular with each other.

Reflector 40 includes reflecting surfaces 42, 44 spaced apart from the light emission surfaces 34, 35 of the optical element 30. Reflecting surfaces 42, 44 are configured to re-direct light from the optical element 30 into a direction parallel with a horizontal plane illustrated in the Figures as P2. Reflecting surfaces 42, 44 are separated by a step 46 that serves to shorten the height of the reflector and expand the lateral size of the emitted light signal. The shape and orientation of the reflecting surfaces 42, 44 are determined by the direction of light incident upon them and the desired direction of light emission from the optical system. In the illustrated embodiment, light leaves the optical element light emission surfaces 34, 35 in a direction generally parallel with plane P1 as shown in FIG. 9. The reflecting surfaces 42, 44 are planar surfaces oriented at an angle of 45° relative to the incident light and plane P1, resulting in light emitted from the optical system 10 in the desired direction, which is perpendicular to plane P1 and generally parallel with plane P2. Each end of the reflector is rotated about axis AR1 to maintain the relationship between the light emission surface of the optical element 30 and the reflecting surfaces 42, 44. Reflecting surfaces 42, 44 and step 46 are also rotated about axis AR2 to maintain the relationship with the optical element 30 light emission surfaces at the top of the optical system 10.

The illustrated embodiment of the disclosed optical system 10 is configured to modify the component of light emitted from the LED array 12 that diverges from the desired horizontal beam, e.g., light that is emitted in directions up or down with respect to horizontal reference plane P2. The illustrated embodiment of the disclosed optical system 10 is configured to maintain the direction of emitted light that reinforces the desired light emission pattern, e.g., directional components parallel with horizontal plane P2. The illustrated embodiment spaces the reflecting surfaces 42, 44 laterally from the LED array 12 to generate a horizontal beam having a large surface area to enhance visibility and cover additional area of the warning light assembly 100.

The disclosed optical system 10 has been described in the context of a specific application, but those skilled in the art will recognize other uses. The disclosed optical system 10 has been described with specific surface configurations, but is not limited to those specific shapes and those skilled in the art will recognize simple modifications to achieve the same or similar functionality. The description is by way of illustration and not limitation.

What is claimed:

1. An LED light assembly comprising:
a first support parallel with a first plane, said support including a heat sink and a PC board to which are mounted a first plurality of LEDs, said first plurality of LEDs arranged along a first linear focal axis parallel with said first plane and included in a second plane perpendicular to said first plane, each of said first plurality of LEDs emitting light in a hemispherical pattern directed away from said first plane, each of said LEDs having an optical axis in said second plane and emitting narrow angle light at angles less than a first angle with respect to said second plane and wide angle light at angles greater than said first angle with respect to said second plane;
an optical element arranged to collect light from said first plurality of LEDs, said optical element comprising first, second and third light entry surfaces and first, second and third light emission surfaces, said first and second light entry surfaces and first and second light emission surfaces separated by said second plane and said third light entry surface and said third light emission surface are bisected by said second plane, said first and second light entry surfaces configured to cooperate with said first and second light emission surfaces, respectively, to re-direct wide angle light emitted from said first plurality of LEDs into a trajectory substantially parallel with said first plane, and said third light entry surface cooperates with said third light emission surface to re-direct narrow angle light emitted from said first plurality if LEDs into a trajectory substantially parallel with said second plane; and
a reflector having first and second reflecting surfaces arranged to reflect wide angle light emitted from said first and second light emission surfaces, respectively, into a trajectory substantially parallel with said second plane, said first and second reflecting surfaces separated by said second plane and spaced apart from said first and second light emission surfaces,
wherein said first linear focal axis extends between the optical axes of LEDs defining longitudinal ends of said first plurality of LEDs, said first, second and third light entry surfaces and said first, second and third light emission surfaces are defined by a cross sectional shape of said optical element projected along said first linear focal axis.

2. The LED light assembly of claim 1, wherein an end of said optical element is defined by the cross sectional shape of said optical element rotated approximately 180° about the optical axis of an LED defining a longitudinal end of said first plurality of LEDs, resulting in end light entry and end light emission surfaces that are surfaces of rotation extending between said first and second light entry and said first and second light emission surfaces.

3. The LED light assembly of claim 1, wherein said first and second reflecting surfaces are defined by a sectional shape of said first and second reflecting surfaces projected along said first linear focal axis.

4. The LED light assembly of claim 1, comprising an end reflecting surface defined by the sectional shape of said first and second reflecting surfaces rotated approximately 180° about the focal axis of an LED defining a longitudinal end of said first plurality of LEDs, said end reflecting surface being a surface of rotation extending between said first and second reflecting surfaces.

5. The LED light assembly of claim 1, wherein said first and second reflecting surfaces each comprise a plurality of reflecting surfaces separated by a separator surface substantially parallel with said first plane so that said plurality of reflecting surfaces are laterally separated from each other by said separator surface portion.

6. The LED light assembly of claim 1, comprising at least one support surface not parallel with said first plane and a second plurality of LEDs on said support surface and arranged along a second linear focal axis within said second plane and not parallel with said first linear focal axis, said optical element including a second segment with first second and third light entry surfaces and first, second and third light emission surfaces, said first and second light entry surfaces separated by said second plane and said third light entry surface and said third light emission surface are bisected by said second plane, said first and second light entry surfaces configured to cooperate with said first and second light emission surfaces, respectively, to re-direct wide angle light emitted from said second plurality of LEDs into a trajectory substantially parallel with said support surface, and said third light entry surface cooperates with said third light emission surface to re-direct narrow angle light emitted from said first plurality if LEDs into a trajectory substantially parallel with said second plane; and     a reflector second segment having first and second reflecting surfaces arranged to reflect wide angle light emitted from said second plurality of LEDs through said first and second light emission surfaces, respectively, into a trajectory substantially parallel with said second plane, said reflector second segment first and second reflecting surfaces separated by said second plane and spaced apart from said optical element second segment first and second light emission surfaces,     wherein said second linear focal axis extends between the optical axes of LEDs defining longitudinal ends of said second plurality of LEDs, said optical element second segment first, second and third light entry surfaces and said first, second and third light emission surfaces are defined by a cross sectional shape of said optical element projected along said second linear focal axis.

7. The LED light assembly of claim 6, wherein said reflector second segment first and second reflecting surfaces are defined by a sectional shape of said reflector second segment first and second reflecting surfaces projected along said second linear focal axis.

8. The LED light assembly of claim 1, comprising second and third support surfaces not parallel with said first plane and second and third pluralities of LEDs on said second and third support surfaces and arranged along second and third linear focal axes within said second plane and not parallel with said first linear focal axis, said optical element including second and third segments each with first, second and third light entry surfaces and first, second and third light emission surfaces, said first and second light entry surfaces separated by said second plane, said third light entry surface and said third light emission surface are bisected by said second plane, said first and second light entry surfaces configured to cooperate with said first and second light emission surfaces, respectively, to re-direct wide angle light emitted from said second plurality of LEDs into a trajectory substantially parallel with said second and third support surfaces, respectively, and said third light entry surface cooperates with said third light emission surface to re-direct narrow angle light emitted from said first plurality of LEDs into a trajectory substantially parallel with said second plane; and     reflector second and third segments having first and second reflecting surfaces arranged to reflect wide angle light emitted from said second and third plurality of LEDs through said second and third optical element first and second light emission surfaces, respectively, into a trajectory substantially parallel with said second plane, said reflector second and third segment first and second reflecting surfaces separated by said second plane and spaced apart from said optical element second and third segment first and second light emission surfaces,     wherein said second and third linear focal axes are not parallel with each other and extend between the optical axes of LEDs defining longitudinal ends of said second and third plurality of LEDs, respectively, said optical element second and third segment first, second and third light entry surfaces and said first, second and third light emission surfaces defined by a cross sectional shape of said optical element second and third segments projected along said second and third linear focal axes, respectively.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,163,806 B1 | |
| APPLICATION NO. | : 14/243931 | |
| DATED | : October 20, 2015 | |
| INVENTOR(S) | : Shimoda | |

It is certified that error appears in the above-identified patent and that said Letters Patent is hereby corrected as shown below:

In the claims

Column 8, line 35, claim 1:
delete "if" and insert --of--

Column 9, line 27, claim 6:
delete "if" and insert --of--

Signed and Sealed this
Twenty-ninth Day of March, 2016

Michelle K. Lee
*Director of the United States Patent and Trademark Office*